(12) United States Patent
Polegato Moretti

(10) Patent No.: US 8,281,501 B2
(45) Date of Patent: Oct. 9, 2012

(54) VAPOR-PERMEABLE AND WATERPROOF SOLE FOR SHOES, SHOE MANUFACTURED WITH THE SOLE, AND METHOD FOR MANUFACTURING THE SOLE AND THE SHOE

(75) Inventor: Mario Polegato Moretti, Crocetta del Montello (IT)

(73) Assignee: Geox, S.p.A., Montebelluna (IT)

( * ) Notice: Subject to any disclaimer, the term of this patent is extended or adjusted under 35 U.S.C. 154(b) by 732 days.

(21) Appl. No.: 12/302,852

(22) PCT Filed: May 29, 2006

(86) PCT No.: PCT/EP2006/005115
§ 371 (c)(1),
(2), (4) Date: Nov. 28, 2008

(87) PCT Pub. No.: WO2007/137604
PCT Pub. Date: Dec. 6, 2007

(65) Prior Publication Data
US 2009/0199438 A1    Aug. 13, 2009

(51) Int. Cl.
*A43B 7/06* (2006.01)
*A43B 1/10* (2006.01)

(52) U.S. Cl. .......... 36/3 B; 36/30 R; 36/102; 36/14; 36/59 R; 12/146 B; 264/244

(58) Field of Classification Search ............... 36/3 B, 36/102, 14, 30 R, 3 A, 3 R, 55, 12, 59 R; 12/146 B
See application file for complete search history.

(56) References Cited

U.S. PATENT DOCUMENTS

| | | | | |
|---|---|---|---|---|
| 6,115,945 | A * | 9/2000 | Ellis, III | 36/102 |
| 6,389,711 | B1 | 5/2002 | Polegato | |
| 6,604,302 | B2 * | 8/2003 | Polegato Moretti | 36/55 |
| 2001/0003875 | A1 | 6/2001 | Moretti | |
| 2001/0010127 | A1 * | 8/2001 | Polegato Moretti | 36/3 B |
| 2005/0000117 | A1 * | 1/2005 | Polegato Moretti | 36/55 |

(Continued)

FOREIGN PATENT DOCUMENTS

JP    2003-521321    7/2003

(Continued)

OTHER PUBLICATIONS

U.S. Appl. No. 12/304,171, filed Dec. 10, 2008, Poligato Moretti.

(Continued)

*Primary Examiner* — Ted Kavanaugh
(74) *Attorney, Agent, or Firm* — Oblon, Spivak, McClelland, Maier & Neustadt, L.L.P.

(57) ABSTRACT

A vapor-permeable and waterproof sole for shoes, including at least one first load-bearing component, including at least one vapor-permeable or perforated portion, including a vapor-permeable or perforated filler, at least one second component, predominantly arranged below the first component with a tread provided thereon. The second component includes through perforations at the vapor-permeable or perforated portion of the first component. Below the vapor-permeable or perforated portion and above the tread a membrane water impermeable and of water vapor permeable material is provided. The first component is constituted by a plastic midsole. The midsole is rigidly coupled to the membrane and to the filler by molding before providing the tread. A single peripheral seal is provided on the membrane formed by the molding of the midsole; the midsole surrounds peripherally the membrane.

24 Claims, 5 Drawing Sheets

U.S. PATENT DOCUMENTS

2005/0252035 A1  11/2005  Moretti et al.

FOREIGN PATENT DOCUMENTS

| | | |
|---|---|---|
| JP | 2003-530178 | 10/2003 |
| WO | 98 51177 | 11/1998 |
| WO | 99 66812 | 12/1999 |
| WO | 2004 004505 | 1/2004 |
| WO | 2005 070658 | 8/2005 |
| WO | 2006 010578 | 2/2006 |

OTHER PUBLICATIONS

U.S. Appl. No. 13/091,355, filed Apr. 21, 2011, Polegato Moretti, et al.

Japanese Office Action issued Apr. 3, 2012 in JP Patent Application No. 2009-512416 (with English translation).

* cited by examiner

VAPOR-PERMEABLE AND WATERPROOF SOLE FOR SHOES, SHOE MANUFACTURED WITH THE SOLE, AND METHOD FOR MANUFACTURING THE SOLE AND THE SHOE

TECHNICAL FIELD

The present invention relates to a vapor-permeable and waterproof sole for shoes.

The present invention also relates to a shoe provided with such sole and to the method for manufacturing both the sole and the corresponding shoe.

BACKGROUND ART

The problems linked to the perspiration of feet inside shoes are known.

It is widely known that most of the perspiration of the foot is generated at the interface between the sole of the foot and the sole of the shoe, and the sweat that forms there, being unable to evaporate, condenses on the plantar insert on which the foot rests; only a minimal part of the sweat evaporates through the upper.

This phenomenon is particularly felt in shoes with a rubber sole; in this case, vapor permeability through the sole is completely prevented.

Solutions to the problem are provided by vapor-permeable and waterproof soles such as the one disclosed in U.S. Pat. No. 5,044,096 and EP-0382904 by the same Applicant, which consists in dividing the rubber sole into two layers with through holes and in interposing a membrane which is impermeable to water and permeable to vapor and is joined peripherally and hermetically to the two layers, so as to not allow water infiltrations.

Subsequent improvements have interposed the vapor-permeable membrane between vapor-permeable or perforated layers of protective material and fillers.

Such perforated soles provided with waterproof and vapor-permeable membranes certainly have constituted remarkable innovations with respect to what was available earlier.

In this regard, it is known to provide a waterproof and vapor-permeable shoe comprising a waterproof and vapor-permeable sole which is injected directly onto a waterproof and vapor-permeable upper fitted on a last for direct injection mold.

According to this manufacturing method, a first lower tread element provided with holes is injected into a first mold.

The lower perforated tread element, a protective element arranged above the lower tread, at the holes, and a waterproof and vapor-permeable membrane above the protective element, are then inserted in a second mold.

Above the membrane there is a vapor-permeable filler, which has a smaller extension than the membrane so as to leave a peripheral surface of said membrane exposed.

This second mold is closed so that the insole of the assembled upper compresses sufficiently the three elements against the lower tread element.

By injecting the second part of the tread, a peripheral seal is formed and the structure of the shoe becomes monolithic.

In practice, the membrane is thus joined hermetically to the midsole and to the tread.

Currently, the need is felt to provide treads which have articulated peripheral elements, such as for example wings which rise externally on the midsole so as to form grip elements arranged laterally to the sole, which besides having retention functions have a particular visual effect; for example, the tread can have a different color with respect to the midsole.

With this type of tread, it is extremely difficult to overmold the midsole onto the tread.

During injection molding of the midsole onto the tread, the articulated peripheral elements in fact tend to rise, making it in practice impossible to obtain correct overmolding.

DISCLOSURE OF THE INVENTION

The aim of the present invention is to provide a vapor-permeable or "breathable" and waterproof sole for shoes which solves the problems noted in known soles.

Within this aim, an object of the present invention is to provide a shoe with a vapor-permeable and waterproof sole which ensures an excellent barrier against the infiltration of water and at the same time has a tread provided with articulated peripheral elements.

Another object of the present invention is to provide a method for manufacturing vapor-permeable and waterproof soles and shoes with vapor-permeable and waterproof soles provided with a tread having articulated peripheral elements.

Another object of the present invention is to provide a method for manufacturing vapor-permeable and waterproof soles and shoes with vapor-permeable and waterproof soles in which the membrane that ensures waterproofing has an excellent peripheral seal.

Another object of the present invention is to provide a vapor-permeable and waterproof sole for shoes whose cost is competitive with respect to the costs of known vapor-permeable shoes.

This aim and these and other objects, which will become better apparent hereinafter, are achieved by a vapor-permeable and waterproof sole for shoes according to the invention, which comprises:

at least one first load-bearing component, which has at least one vapor-permeable or perforated portion, which comprises a vapor-permeable or perforated filler, at least one second component, which is predominantly arranged below said first component and on which a tread is provided, said at least one second component having through perforations substantially at said at least one vapor-permeable or perforated portion of said upper component, below said vapor-permeable or perforated portion and above said tread there being a membrane made of a material which is impermeable to water and permeable to water vapor, characterized in that said at least one first component comprises a midsole made of plastic material, the outermost peripheral portion whereof, when said sole is associated with an upper, is visible, said midsole being rigidly or jointly coupled to said membrane and to said filler by molding before providing said tread, a single peripheral seal being provided on said membrane and being formed by the molding of said midsole, said midsole surrounding peripherally said membrane.

BRIEF DESCRIPTION OF THE DRAWINGS

Further characteristics and advantages of the present invention will become better apparent from the description of a preferred but not exclusive embodiment thereof, illustrated by way of non-limiting example in the accompanying drawings, wherein.

WAYS OF CARRYING OUT THE INVENTION

Figure 1:
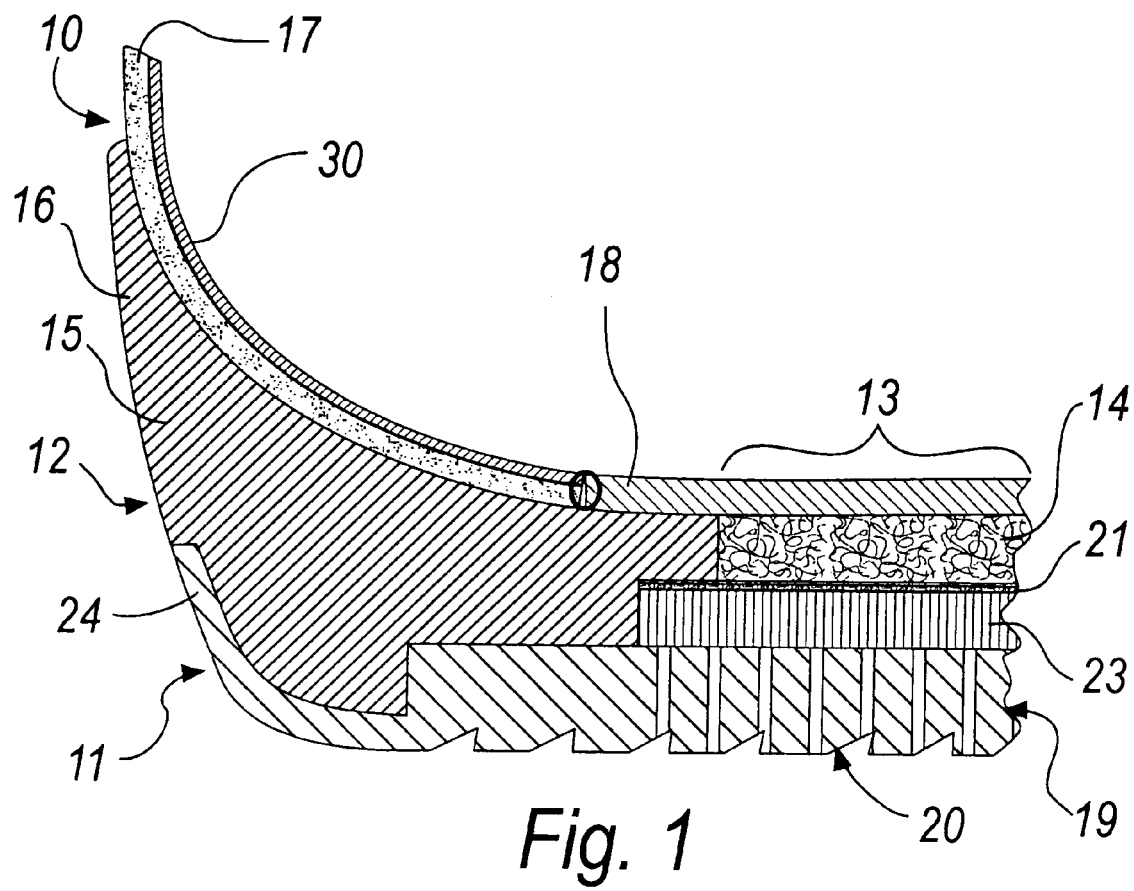
FIG. 1 is a schematic transverse sectional view of a portion of a shoe according to the invention.
Figure 2:
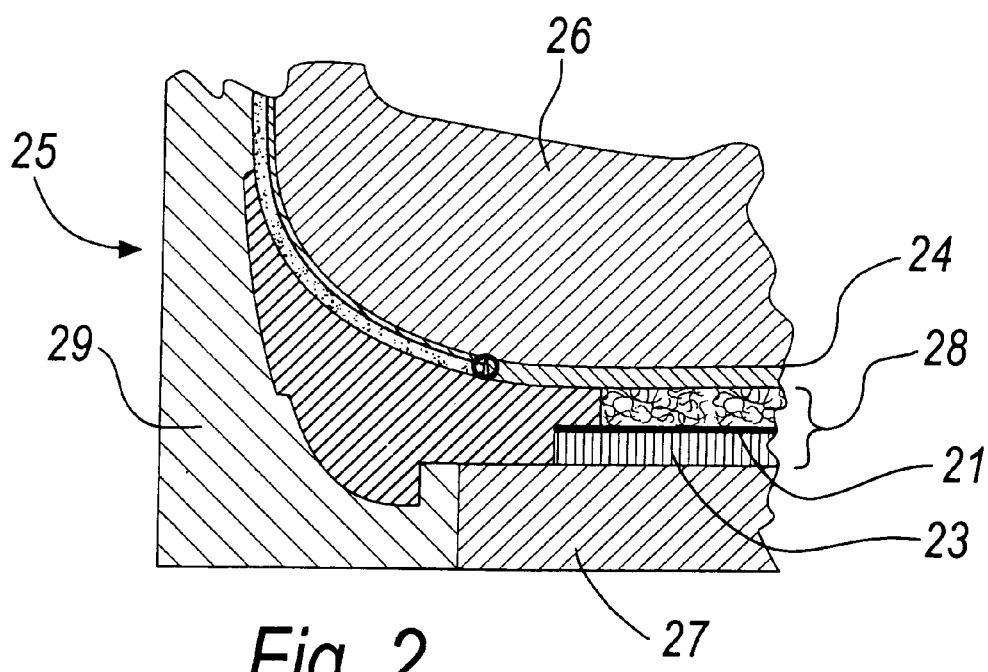
FIG. 2 is a schematic transverse sectional view of a portion of a mold for direct injection on an upper for manufacturing the shoe of FIG. 1.

With reference to FIGS. 1 to 4, a shoe which uses a sole according to the invention is generally designated by the reference numeral 10.

The shoe 10 is provided with a vapor-permeable or "breathable" and waterproof sole 11, which comprises a first load-bearing component 12, which has a vapor-permeable or perforated portion 13, located preferably on the front region of the foot, where most perspiration occurs.

The vapor-permeable or perforated portion 13 comprises a filler 14 which is breathable, such as for example a felt, or perforated.

The first component 12 in practice is a midsole 15, the outermost peripheral portion 16 whereof is visible when the sole 11 is associated with an upper, designated here by the reference numeral 17.

In practice, such outermost peripheral portion 16 of the midsole 15 is the lateral portion of the sole 11.

An internal lining 30 and a vapor-permeable or perforated insole 18 are associated with the upper 17.

The sole 11 also comprises a second component 19, which is arranged predominantly below the first component 12 and on which a tread 20 is provided; said second component 19 has through perforations substantially at the vapor-permeable or perforated portion 13.

Figure 3:
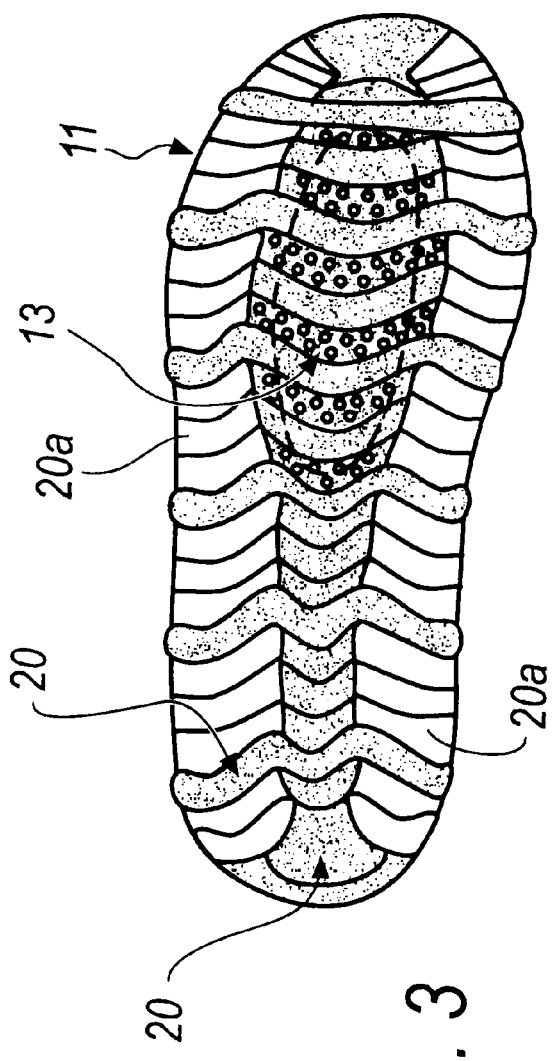
FIG. 3 is a bottom plan view of a shoe according to the invention.
Figure 4:
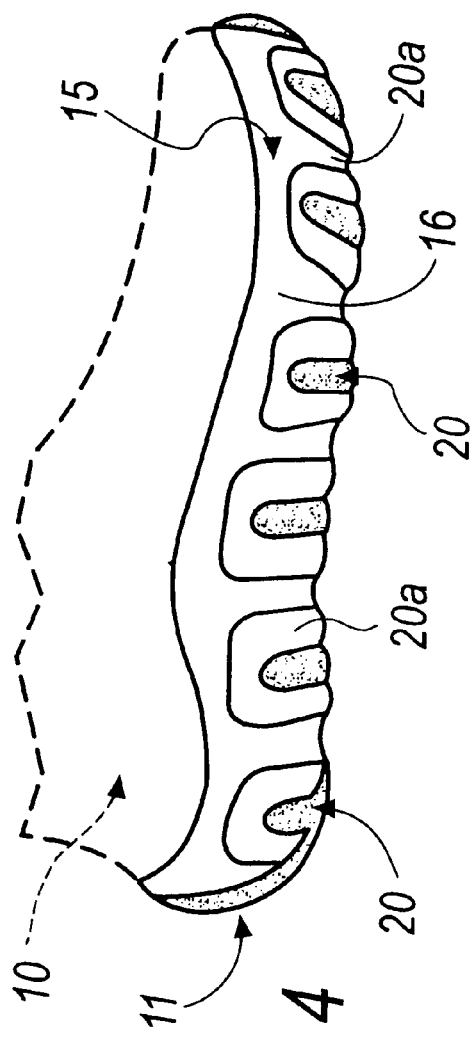
FIG. 4 is a schematic side view of the shoe of FIG. 3.

FIGS. 3 and 4 are bottom and lateral views of the sole 11.

A membrane 21, made of a material which is impermeable to water and permeable to water vapor (normally commercially available, made for example of expanded polytetrafluoroethylene), is provided below the vapor-permeable or perforated portion 13 and above the tread 20 and is laminated with a mesh (not shown in the figures) for supporting such membrane, the mesh lying above the membrane and being made of synthetic material.

The membrane 21 is preferably mated, by spot gluing, above a vapor-permeable or perforated protective element 23, such as for example a felt, a woven fabric, a nonwoven fabric or a pile fabric, or other vapor-permeable materials capable of protecting the membrane against external impacts or external objects which might pass through the holes provided in the tread 20.

The membrane 21 is superimposed on the protective element 23 and has substantially the same profile.

The membrane 21 is larger than the filler 14 in terms of overall extension.

The filler 14 is instead smaller than the membrane 21.

The midsole 15, made of plastic material, is rigidly or jointly coupled to (integral with) the membrane 21 (with the mesh and the protective element 23) and to the vapor-permeable filler 14 by molding before gluing the tread 20, as explained in the manufacturing method described hereinafter.

Advantageously, the molding of the midsole 15 on the peripheral region of the membrane 21 provides a single perimetric/peripheral seal on such membrane.

In this embodiment, the tread 20 has articulated peripheral portions 24, such as for example wings, which adhere to the outermost peripheral portion 16 of the midsole 15.

The midsole 15 forms, in cooperation with the tread 20, a secondary tread 20a, which is arranged between mutually separate portions of said tread 20; said separate portions are, for example, the articulated peripheral portions 24.

The method for manufacturing the shoe 10 uses a mold for direct injection on an upper, said mold being generally designated by the reference numeral 25.

The method consists in fitting the upper 17, associated with the corresponding insole 18 and lining 30, on a last 26 for direct injection molding on an upper.

An assembly, generally designated by the reference numeral 28, is applied to the surface of the lower mold part 27 and is formed, sequentially from the top downwardly, by the filler 14, by the membrane 21 (with the corresponding mesh), and by the protective element 23.

Of this assembly 28, the protective element 23 is in contact with the lower mold part 27.

The mold is closed in an upward region by the last 26 so as to press the assembly 28 against the lower mold part 27.

The mold is closed laterally by lateral rings 29.

Adhesive may be provided on the protective element 23, on the face in contact with the lower mold part 27, in order to ensure momentary adhesion to the lower mold part 27 when the assembly is deposited.

Said adhesive, which in any case is weak, consists for example of powders which are reactivated at low temperature.

In order to allow correct positioning of the assembly on the lower mold part 27, on said lower mold part there is an abutment, such as for example a slight perimetric/peripheral incision which follows the plan shape of the protective element 23 and of the membrane 21.

In this manner it is possible to position correctly the assembly 28 in the mold; the weak adhesive provided on the protective element 23 avoids accidental displacements of the correct position and any infiltrations of plastic material below the membrane 21.

While the mold 25 is closed, plastic material, for example polyurethane material (PU), is injected in order to form the midsole 15, which is superimposed on the lower part of the upper 17.

This injection surrounds the assembly 28, forming a seal, not designated by a reference numeral in the figures, around the membrane 21.

The tread 20, made for example of thermoplastic polyurethane material (TPU), is molded separately and is then glued, according to known methods, to the midsole 15.

Advantageously, it is possible to provide on the tread an additional reference (not shown in the figures), such as a fine peripheral groove, which delimits the adhesive bonding region with respect to the assembly 28 (and therefore with respect to the membrane); in practice, said additional reference delimits, on the tread 20, an adhesive bonding region which in plan view is not superimposed on the vapor-permeable filler 14.

With a substantially similar method it is possible to provide soles which are subsequently assembled to the upper, for example by gluing or sewing.

Figure 5:
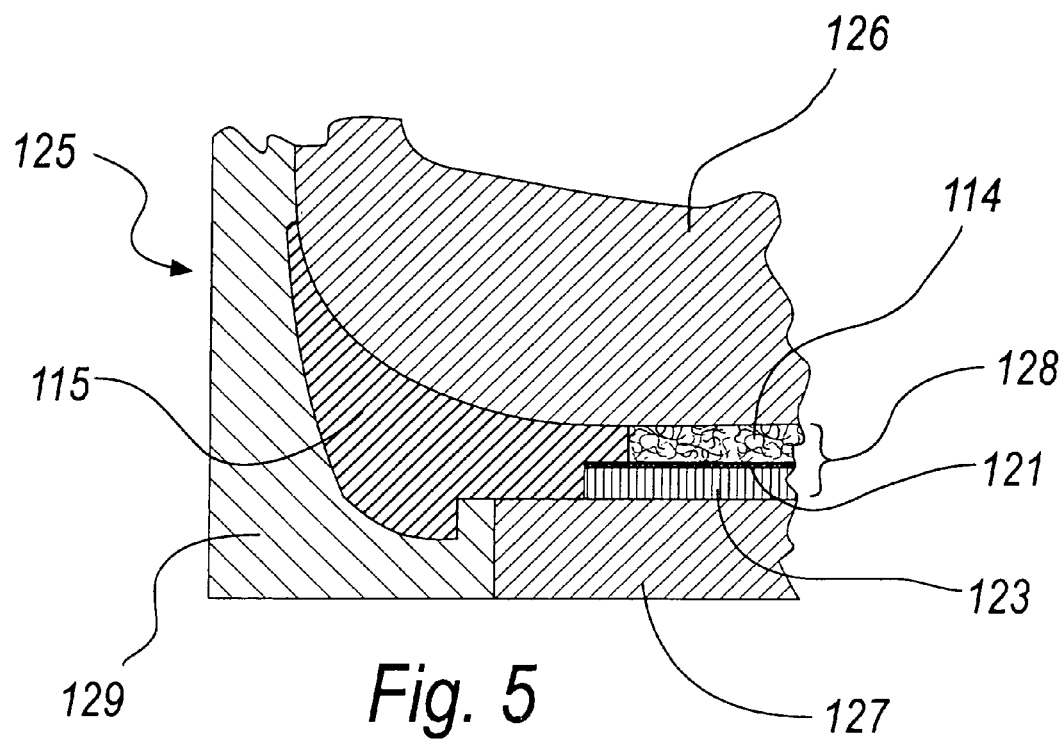
FIG. 5 is a schematic transverse sectional view of portion of a mold for injection or pouring, adapted to manufacture a sole for shoes according to the invention.

In this case, the method provides, instead of the last on which the upper is fitted, the closure of the mold, designated by the reference numeral 125 in FIG. 5, with an upper mold part, such as a dummy last 126.

In this version it is possible to provide a midsole 115 by molding obtained by pouring the plastic material or alternatively by injection molding according to known methods.

Figure 6:
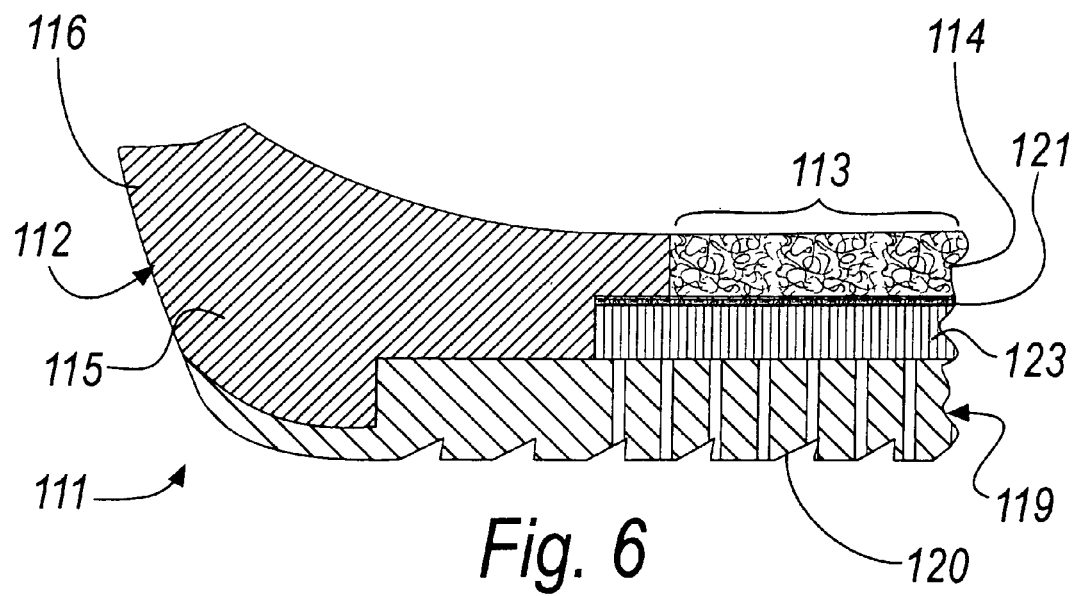
FIG. 6 is a schematic transverse sectional view of a portion of a sole provided with the mold of FIG. 5.
Figure 7:
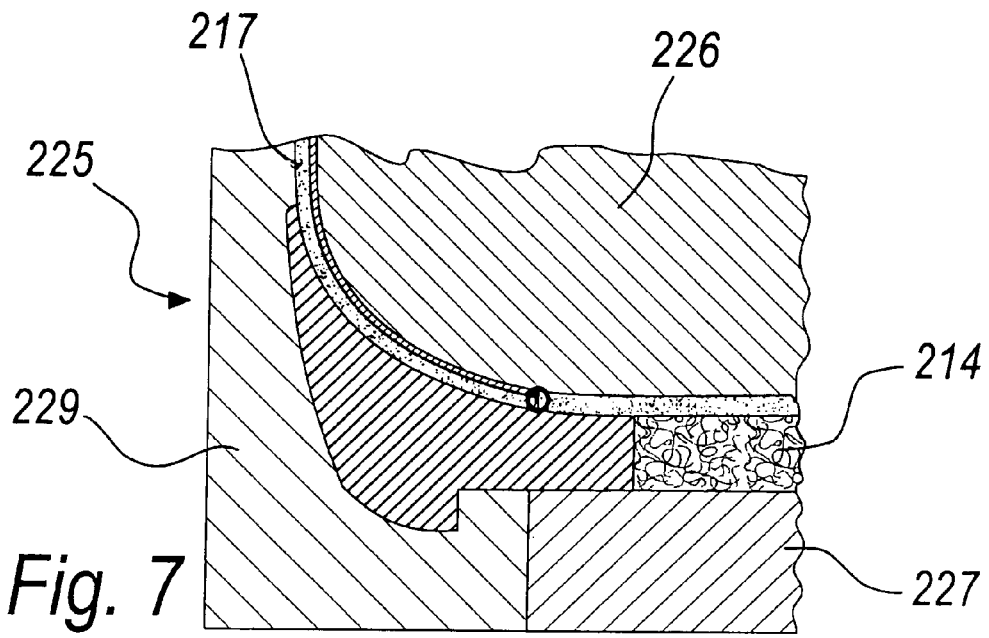
FIG. 7 is a schematic transverse sectional view of a portion of a mold for direct injection on an upper for manufacturing an alternative embodiment of a shoe according to the invention.

Therefore, in summary, the method for manufacturing the sole 111 alone (shown in FIG. 6) consists in applying to the surface of the lower mold part 127 the assembly 128, which is formed by the filler 114, by the membrane 121 (with the corresponding mesh), and by the protective element 123; of this assembly 128, the protective element 123 is in contact with the lower mold part 127.

The mold is closed in an upward region by the dummy last 126 (according to known methods), so as to press the assembly 128 against the lower mold part 127; the mold is closed laterally by lateral rings 129.

While the mold is closed, plastic material, for example polyurethane material (PU), is introduced in order to form the midsole.

This introduction of plastic material can occur by pouring or by injection, according to known methods and with known equipment; it is evident that the type of equipment (molds, injectors, et cetera) will be different depending on the technology used.

This introduction of plastic material surrounds the assembly 128, creating a seal around the membrane (not shown in the figures).

The tread 120, made for example of thermoplastic polyurethane material (TPU), is molded separately and is then glued, according to known methods, to the midsole 115.

In the case of the production of the sole alone, too, it is possible to use weak adhesives for positioning within the mold the assembly that contains the membrane and to provide the abutments for said positioning and delimiting of the adhesive bonding region of the tread.

The vapor-permeable and impermeable or waterproof sole 111 comprises, as in the preceding example, a first load-bearing component 112, which has a perforated or vapor-permeable portion 113, preferably arranged on the front region of the foot, where most perspiration occurs.

The vapor-permeable or perforated portion 113 comprises the filler 114, which is vapor-permeable, such as for example a felt, or is perforated.

The first component 112 in practice is the midsole 115, the outermost peripheral portion 116 whereof, when the sole 111 is associated with an upper, is exposed.

The sole 111 also comprises a second perforated component 119, which is arranged predominantly below the first component 112 and on which the tread 120 is formed.

In other embodiments, not shown, it is possible to use an additional protective element for the membrane which is joined to the tread before the step of assembly to the midsole.

For example, such additional protective element can be made of Kevlar fiber and can be molded together with the tread.

The method for manufacturing a shoe with vapor-permeable and waterproof sole described above has the advantage of injecting the midsole directly onto the upper independently of the tread, achieving considerable operating flexibility, also in relation to association with treads of different types provided with articulated perimetric/peripheral elements or provided with simple profiles.

Figure 8:
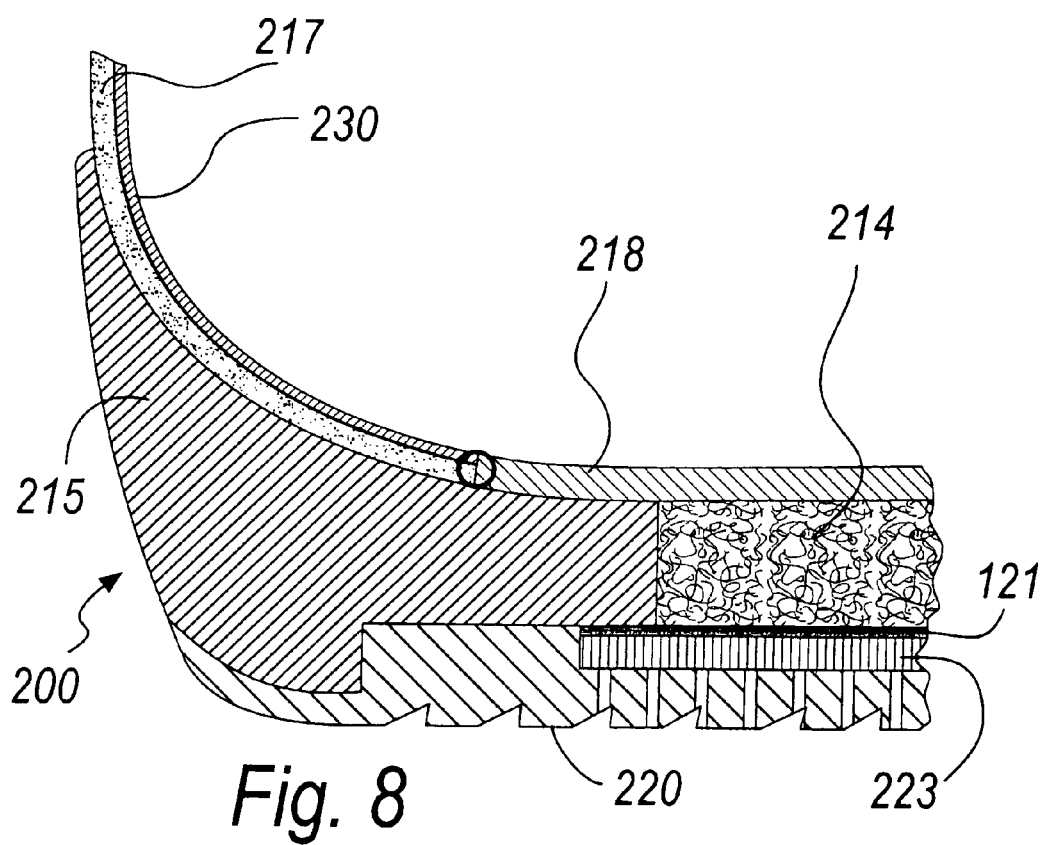
FIG. 8 is a schematic transverse sectional view of a portion of a shoe provided by means of the mold of FIG. 7.

An alternative method for providing a shoe, designated by the reference numeral 200 in FIG. 8, then provides the possibility to mold separately a perforated tread 220 and associate therewith the membrane 221 (with the corresponding mesh), to which the corresponding protective element 223 is spot-glued according to known techniques.

For example, it is possible to mold the tread 220 and then spot-glue thereto the protective element 223, and the membrane 221 can be sealed peripherally, so as to not allow lateral infiltrations of water.

The method for manufacturing the midsole 215 injected onto the upper 217 consists in fitting the upper 217, associated with the corresponding insole 218 and lining 230, on a last 226 for direct injection molding on the upper.

The filler 214 is applied to the surface of the lower mold part 227.

The mold is closed in an upward region by the last 226 so as to press the filler 214 against the lower mold part 227.

The mold is closed laterally by lateral rings 229.

As in the preceding examples, on the filler 214, on the face in contact with the lower mold part 227, there may be adhesive in order to ensure temporary adhesion to said lower mold part 227 when the filler 214 is deposited.

The plastic material is then injected so as to form the midsole 215, which is superimposed on the lower part of the upper and the filler 214.

The tread 220 with the membrane 221 is then glued to the intermediate component constituted by the upper and the midsole.

Figure 9:
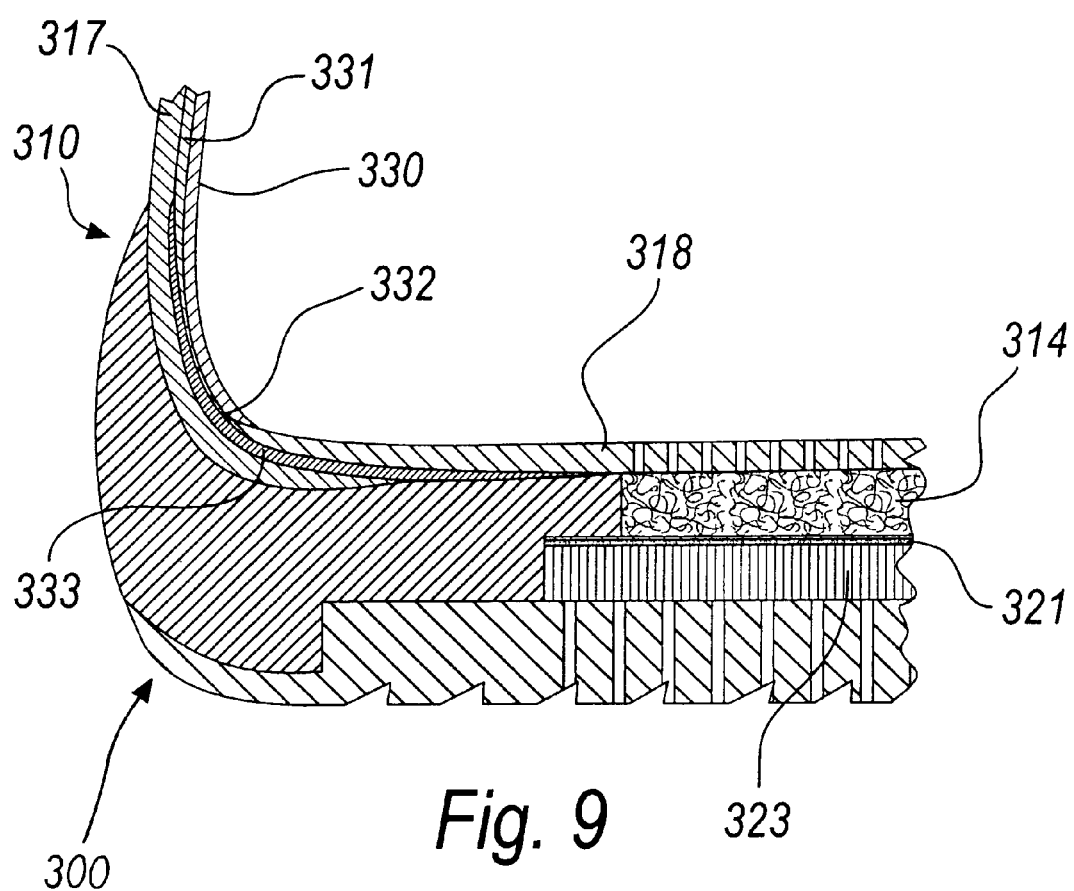
FIG. 9 is a schematic transverse sectional view of another embodiment of a shoe according to the invention.

With reference to the shoes 100 and 200 described above, a different embodiment, generally designated by the reference numeral 300, is shown in FIG. 9; said figure illustrates the particular case of the shoe 100.

Said shoe 300 is of the fully waterproof type.

The internal lining 330 associated with the upper 317 is in fact coupled externally to an additional membrane 331 made of a material which is impermeable to water and permeable to water vapor, according to the background art, for example according to a method disclosed in Italian patent no. 1307164.

According to this manufacturing method, an assembly last (not shown in the figures) is covered with the lining 330, the seams whereof are sealed by heat-sealing, the additional membrane 331 being coupled externally thereto.

The lining 330 is associated, at its lower perimeter, with the insole 318, which is vapor-permeable or perforated, for example by means of stitched seams 332.

The upper flaps of the upper 317 are associated with the corresponding upper flaps of the lining 330.

Subsequently, adhesive (not shown in the figures) of the hydrolysis-resistant type is applied in the vicinity of the stitched seams 332 for joining the insole 318 and the lining 330.

A complementarily sized tape 333, made of an impermeable material and also spread with a hydrolysis-resistant adhesive on both of its faces, is then applied to the adhesive.

The type of adhesive is of the type known commercially as "hot melt".

The resulting intermediate component is heated in order to reactivate the hydrolysis-resistant adhesive.

The upper 317 is then made to adhere to the tape 333, which is spread with adhesive.

The intermediate component (upper and lining with membrane, insole) is then fitted onto the last for direct injection molding on the upper, and the process continues with the same method described above for providing the shoe 100 (or optionally the shoe 200); in particular, in the case shown in FIG. 9, the midsole 315 is injected in a mold onto the upper 317 by such an extent as to cover completely the tape 333, and onto the assembly 328 composed, in succession downwardly, from above, by the filler 314, by the membrane 321 (with the corresponding mesh) and by the protective element 323.

In this manner, a completely waterproof shoe is also obtained.

In practice it has been found that the invention thus described solves the problems noted in known types of vapor-permeable and waterproof soles and shoes with vapor-permeable and waterproof soles; in particular, the present invention provides a shoe with vapor-permeable and waterproof sole provided with a midsole which is injected onto the upper and is provided laterally with exposed articulated perimetric/peripheral elements of the tread.

The particular configuration of the shoe is allowed by the particular production method, which conveniently provides for the injection of the midsole separately with respect to the tread, which is associated at a later time.

Advantageously, the method can also be applied to cases in which the tread does not have a particular lateral profile; this method in fact allows the production of shoes with vapor-permeable and waterproof soles to be extremely flexible.

Advantageously, the sole thus provided can also be manufactured with techniques for pouring plastic material into a mold.

The use of a vapor-permeable filler such as for example a felt allows to increase the surface for evacuation of the water vapor with respect to the solutions in which said portion is occupied by perforated midsole elements.

The invention thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to requirements and to the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A vapor-permeable and waterproof sole for shoes, comprising:
at least one first load-bearing component including at least one vapor-permeable or perforated portion, which includes a vapor-permeable or perforated filler;
at least one second component, which is predominantly arranged below said first component and on which a tread is provided, said at least one second component including through perforations substantially at said at least one vapor-permeable or perforated portion of said first load-bearing component; and
a membrane made of a material which is impermeable to water and permeable to water vapor, the membrane being disposed below said vapor-permeable or perforated portion and above said tread,
wherein said at least one first load-bearing component further includes a midsole made of plastics, an outermost peripheral portion whereof, when said sole is associated with an upper, is visible, said midsole being rigidly coupled to said membrane and to said filler by molding before attaching said tread thereto, a single peripheral seal being provided on said membrane and being formed by the molding of said midsole, said midsole peripherally surrounding said membrane, and
wherein said tread includes articulated peripheral elements that are wing projections disposed along an outer peripheral portion of said midsole, such that said midsole forms, in cooperation with said tread, a secondary tread arranged between mutually separate portions of said tread.

2. The sole according to claim 1, wherein said midsole is rigidly coupled to said membrane and to said filler by injection in a mold.

3. The sole according to claim 1, wherein said midsole is rigidly coupled to said membrane and to said filler by pouring into a mold.

4. The sole according to claim 1, wherein said membrane is larger than an overall extension of said filler.

5. The sole according to claim 4, wherein below said membrane there is at least one vapor-permeable or perforated protective element for said membrane.

6. The sole according to claim 5, wherein said protective element is joined to said membrane by spot-gluing before molding said midsole.

7. The sole according to claim 6, comprising an additional vapor-permeable or perforated protective element, which is joined to said tread before molding said midsole.

8. The sole according to claim 1, wherein said articulated peripheral elements rise laterally on the outer peripheral portion of said midsole.

9. A shoe, comprising an upper with an internal lining and a vapor-permeable or perforated insole, which are associated with a sole according to claim 1, said midsole of said sole being rigidly coupled to said upper by injection in a mold.

10. The shoe according to claim 9, wherein the shoe is completely waterproof.

11. The shoe according to claim 10, wherein said lining is coupled externally to a waterproof and vapor-permeable membrane and is associated below said insole, said lining being covered externally by said vapor-permeable insole,
wherein a tape of waterproof material is glued externally with respect to a joining region between said lining and said insole, said upper being glued onto said tape.

12. A method for manufacturing shoes with a vapor-permeable and waterproof sole, comprising:
fitting an upper, associated with a corresponding insole and with a lining, on a last for a direct injection molding on the upper;
applying an assembly to a surface of a lower mold part of a mold the assembly being formed, in succession downwardly from above, by a vapor-permeable or perforated filler, a membrane made of a material which is impermeable to water and permeable to water vapor, and a protective element, which is also vapor-permeable or perforated and is in contact with said lower mold part;
closing the mold in an upward region so as to press said assembly against the lower mold part;
injecting plastic material to form a midsole which is superimposed on part of said upper such that an outermost peripheral portion thereof is visible when said sole is associated with said upper, said injection forming a single peripheral seal around said membrane such that said midsole peripherally surrounds said membrane and is rigidly coupled to said membrane and said filler, said midsole and said filler forming a first load-bearing component; and gluing a second component including a preformed tread to said midsole such that the membrane is disposed below said vapor-permeable or perforated filler and above said tread, said preformed tread including through perforations disposed substantially at said vapor-permeable or perforated filler, said tread including articulated peripheral elements that are wing projections disposed along an outer peripheral portion of said midsole, such that said midsole forms, in cooperation with said tread, a secondary tread arranged between mutually separate portions of said tread.

13. The method according to claim 12, wherein adhesive is provided on said protective element for momentary adhesion to said lower mold part.

14. The method according to claim 13, wherein said adhesive comprises powders which are reactivated at low temperature.

15. The method according to claim 12, wherein, before the step of fitting said upper, the method further comprising:
fitting said lining on an assembly last, where an outside of said lining is mated with an additional membrane made of a material which is impermeable to water and permeable to water vapor, said lining being joined to said insole;
applying adhesive in a vicinity of a connecting region between the insole and the lining;
applying an impermeable tape to said adhesive, adhesive being provided on both faces of said tape; and
adhering said upper to said tape.

16. A method for manufacturing vapor-permeable and waterproof soles, comprising:
applying an assembly to a surface of a lower mold part of a mold, the assembly being formed, in succession downwardly from above, by a vapor-permeable or perforated filler, a membrane made of a material which is impermeable to water and permeable to water vapor, and a protective element, which is also vapor-permeable or perforated and is in contact with said lower mold part;
closing the mold in an upward region by a dummy last, so as to press said assembly against the lower mold part;
introducing plastic material to form a midsole such that an outermost peripheral portion thereof is visible when said sole is associated with an upper, the midsole forming a single peripheral seal around said membrane such that said midsole peripherally surrounds said membrane and is rigidly coupled to said membrane and said filler, said midsole and said filler forming a first load-bearing component; and
gluing a second component including a preformed tread to said midsole such that the membrane is disposed below said vapor-permeable or perforated filler and above said tread, said preformed tread including through perforations disposed substantially at said vapor-permeable or perforated filler, and said tread including articulated peripheral elements that are wing projections disposed along an outer peripheral portion of said midsole, such that said midsole forms, in cooperation with said tread, a secondary tread arranged between mutually separate portions of said tread.

17. The method according to claim 16, wherein said midsole is formed by injection-molding plastic material.

18. The method according to claim 16, wherein said midsole is formed by pouring plastic material into a mold.

19. The method according to claim 16, wherein adhesive is provided on said protective element for momentary adhesion to the lower mold part.

20. The method according to claim 19, wherein said adhesive comprises powders reactivated at low temperature.

21. A method for manufacturing shoes with a vapor-permeable and waterproof sole, comprising:
fitting an upper, associated with a corresponding insole and with a lining, on a last for direct injection molding on the upper;
applying a vapor-permeable or perforated filler to a surface of a lower mold part of a mold;
closing the mold in an upward region by said last, so as to press said filler against the lower mold part;
attaching a membrane below said vapor-permeable or perforated filler, said membrane being made of a material which is impermeable to water and permeable to water vapor;
injecting plastic material to form a midsole, which is superimposed on part of said upper, such that an outermost peripheral portion thereof is visible when said sole is associated with said upper, said injection forming a single peripheral seal around said membrane such that said midsole peripherally surrounds said membrane and is rigidly coupled to said membrane and said filler, said midsole and said filler forming a first load-bearing component; and
gluing a second component including a preformed tread to said midsole such that the membrane is disposed below said vapor-permeable or perforated filler and above said tread, said preformed tread including through perforations disposed substantially at said vapor-permeable or perforated filler, the membrane and a corresponding vapor-permeable or perforated protective element being associated with said preformed tread, and said tread including articulated peripheral elements that are wing projections disposed along an outer peripheral portion of said midsole, such that said midsole forms, in cooperation with said tread, a secondary tread arranged between mutually separate portions of said tread.

22. The method according to claim 21, wherein adhesive is present on said filler for momentary adhesion to said lower mold part.

23. The method according to claim 22, wherein said adhesive comprises powders which are reactivated at low temperature.

24. The method according to claim 21, wherein, before the step of fitting said upper, the method further comprising:
fitting said lining to an assembly last, said lining being coupled externally with an additional membrane made of a material which is impermeable to water and permeable to water vapor, said lining being joined to said insole;
applying adhesive around a region connecting the insole and the lining;
applying an impermeable tape, on both faces whereof adhesive is present, to said adhesive; and
adhering said upper to said tape.

* * * * *